(12) United States Patent
Yoshimura

(10) Patent No.: US 6,754,851 B2
(45) Date of Patent: Jun. 22, 2004

(54) DEBUGGING KERNEL SYSTEM

(75) Inventor: Miyoko Yoshimura, Chofu (JP)

(73) Assignee: ERGCo., Ltd., Tokyo (JP)

( * ) Notice: Subject to any disclaimer, the term of this patent is extended or adjusted under 35 U.S.C. 154(b) by 592 days.

(21) Appl. No.: 09/779,477

(22) Filed: Feb. 9, 2001

(65) Prior Publication Data
US 2002/0046364 A1 Apr. 18, 2002

(30) Foreign Application Priority Data
Jun. 30, 2000 (JP) ........................................ 2000-197683

(51) Int. Cl.$^7$ ................................................ G06F 11/00
(52) U.S. Cl. ........................... 714/38; 709/103; 717/124
(58) Field of Search ............................. 714/38, 34, 25, 714/28; 709/103; 717/124; 712/227

(56) References Cited

U.S. PATENT DOCUMENTS

| 5,632,032 A | * | 5/1997 | Ault et al. ................... 709/100 |
| 5,889,988 A | * | 3/1999 | Held ........................... 709/103 |
| 5,958,049 A | * | 9/1999 | Mealey et al. ................. 713/1 |
| 5,964,890 A | * | 10/1999 | Inui et al. ..................... 714/28 |
| 6,094,730 A | * | 7/2000 | Lopez et al. .................. 714/28 |
| 6,108,744 A | * | 8/2000 | Lebee ......................... 710/266 |

* cited by examiner

Primary Examiner—Robert Beausoliel
Assistant Examiner—Christopher S McCarthy
(74) Attorney, Agent, or Firm—Venable LLP; Michael A. Sartori, Ph.D

(57) ABSTRACT

A debugging kernel system includes a host machine having a program debugging tool and a target machine having a sales slip output system. A target board is built in the target machine, and an agent function, a kernel, a debugging kernel, and an application program are stored thereon. The debugging kernel is small and executes multi-tasking control and recognizes and controls all statuses of the system on the target board.

4 Claims, 7 Drawing Sheets

DEBUGGING KERNEL SYSTEM

BACKGROUND OF THE INVENTION

1. Field of the Invention

The present invention relates to a debugging kernel system which is used in an integrated development environment system.

2. Description of the Related Art

Currently, supporting tools for developing systems built in to home electric appliances and cellular phones (hereinafter abbreviated to built-in systems), such as an integrated development environment (IDE), have been developed and put on the market.

An integrated development environment is a development tool whereby all of the programming steps up to testing can be executed under one environment.

FIG. 9 is a schematic diagram of the framework of an integrated development environment.

Generally, the current integrated development environment (development tool) includes a personal computer (hereinafter referred to as host machine) 17, a board built in a product (hereinafter referred to as a target board) 18, and a network 19 via which the host machine 17 is connected to the target board 18. Thereafter, the host machine 17 produces a program. The produced program is downloaded to the target board 18, is executed on the target board 18, and is corrected by checking the executing status on the target board 18 via the host machine 17.

FIG. 10 is a diagram for illustrating the functions of tools used under the integrated development environment.

The integrated development environment is executed by using functions operating on the host machine 17 and the target board 18.

The functions on the host machine 17 mainly comprise a program producing tool 20 for producing programs, e.g., an editor, and a program debugging tool 21 for debugging the programs. The functions on the target board 18 mainly comprise an agent function 22 for transmitting the operating status of the target board 18 to the functions on the host machine 17, and a kernel 23 for controlling an application program 24 produced by a user as well as the agent function 22.

Among the functions operating on the target board 18, the application program 24 produced by the user and the kernel 23 become a built-in project 25.

If only a proprietary kernel (kernel having an original specification) is supported, the following inconveniences occur.

That is, a conventional integrated development environment is developed and presented by a kernel vendor and thus the kernel used by a product developer (hereinafter referred to as a user) is limited to the proprietary kernel which is developed by the kernel vendor. Therefore, the user of the integrated development environment must automatically adopt the proprietary kernel of the kernel vendor in the product.

However, the kernel sold by the kernel vendor is based on a royalty system. In the case of using the kernel in the product, the user has to pay a high royalty to the kernel vendor when the product is sold.

Because the kernel is proprietary, the specifications do not match the functions of the product when executed, and the user cannot change the specifications. If the user desires to develop a system without using the proprietary kernel, the user cannot develop the system under the integrated development environment.

If the user develops the system by using a kernel having a different specification, the user has to prepare different development tools, thereby necessitating a large investment for a different development environment. If the development environment changes depending on the product development project, the efficiency decreases and storage also becomes complex.

In summary, the following problems when using only the proprietary kernel from the kernel vendor are: (1) a project using a kernel with a different specification must be developed by using different development tools; (2) a kernel from a different kernel vendor cannot be used; and (3) a high royalty must be paid, etc.

Next, a description of the relationship between the integrated development environment and the existing development tools is given.

Current integrated development environments cooperate with tool from various other companies (third parties) and, thereby, the user can use existing development tools. However, the available development tools are determined by the provider of the integrated development environment, not by the user. Unless a company and a product development project have a large influence, it is impossible to integrate and use a desired development tool in the integrated development environment.

It is very important for a developer to be able to efficiently debug a system which is integrated in a product during the development of the built-in system. When the integrated system is developed, in many cases, the system is first produced on a target board and then the system is integrated in the product. Therefore, when the target board is formed, a so-called ROM monitor is frequently used. Generally, the ROM monitor can monitor signals in the hardware, etc., but cannot debug a kernel which is integrated in the product. In a system which uses no kernel, there is a problem in that a large number of debugging functions cannot be used.

The following environments are required for a system developed under the integrated development environment.

(1) A standard specification kernel enables the use of a product having any desired specification and a product manufactured by any desired company, and also enables the use of any system without a kernel.

(2) If the standard specification kernel in (1) is assumed to be μITRON (Micro Industrial/The Real-time Operating system Nucleus), OSEK/VDX (Open System and the Corresponding Interfaces for Automotive Electronics), or POSIX (Portable Operating System Interface for UNIX), the kernel can correspond to environments other than the above-mentioned one.

SUMMARY OF THE INVENTION

It is an object of the present invention to provide a debugging kernel system which can respond to the requirements for a system developed under the above-described integrated development environment (environment tool).

In order to achieve the above objects, a debugging kernel system according to the present invention includes a host system including a program debugging tool, and a target machine having a kernel which includes a product subsystem, and a target subsystem having a debugging kernel which includes a thread scheduling function and an interrupt process function on the target subsystem, wherein the debugging kernel controls the product subsystem and the target subsystem which has a function operating thereon that is loaded as a thread for control thereby, and the thread scheduling function assigns a priority to the threads and determines a process to be executed next by scheduling according to the priority, and the interrupt process function executes an interrupt process by performing a predetermined process between the product subsystem and the target subsystem so as to prevent the product subsystem from preempting a process of the debugging kernel.

The product subsystem includes a product kernel for calling a scheduler of the debugging kernel before the scheduling ends and a task is thereafter executed and for informing the debugging kernel of the priority of a thread to be currently executed, and the debugging kernel compares the priority with the priority of the thread to be currently executed and determines the process to be executed.

The target subsystem has an abstract kernel, and a thread operating on the target subsystem uses the debugging kernel via an interface of the abstract kernel.

The debugging kernel has a system mode and a user mode for a debugging status of a product subsystem.

DESCRIPTION OF THE PREFERRED EMBODIMENTS

Figure 1:
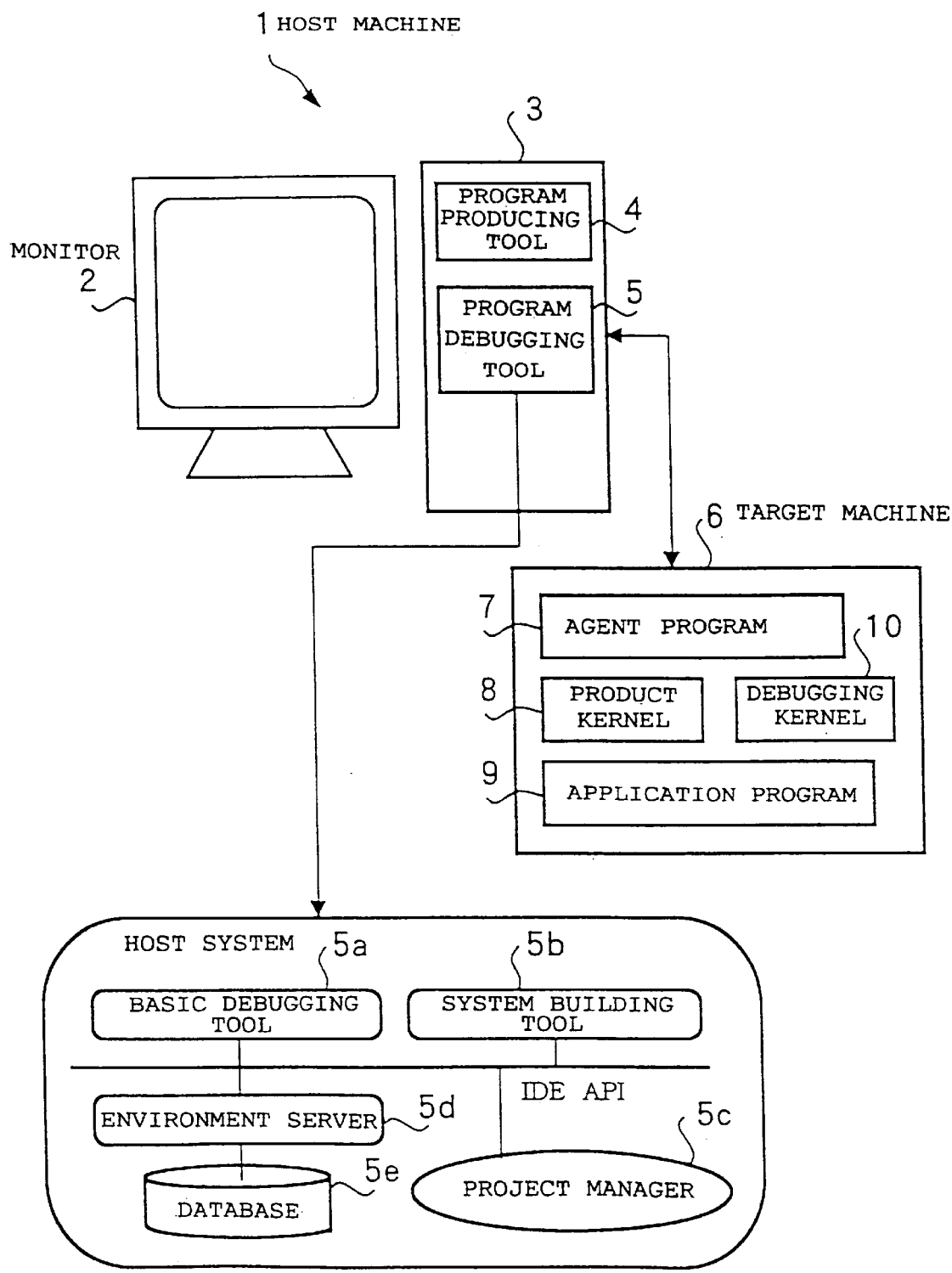
FIG. 1 is a schematic diagram showing the structure of a system to which a debugging kernel system according to the present invention is applied.

FIG. 1 shows the structure of a host machine 1 comprising a host system and a target machine 6.

A target board is integrated in the target machine 6 which is, for example, a device constructing a sales slip output system which runs on predetermined application software.

A program producing tool 4 and a program debugging tool 5 are stored in a main body 3 of the host machine 1.

On the other hand, an agent program 7, a product kernel 8, a debugging kernel 10, and an application program 9 are stored in the target machine 6.

The debugging kernel 10 is a small kernel for multi-tasking control which checks and controls all of system statuses on the target board. In order to simplify the description, the kernel integrated in a product is referred as to a product kernel.

The debugging kernel 10 controls the agent program 7 for executing an agent function and the product kernel 8. The application program 9 produced by a user is controlled by the product kernel 8. The user can select any kernel which has a standard specification as a product kernel. If the system has no kernel, the debugging kernel 10 controls the agent program 7 as the agent function program, so that a debugging tool can be used under the integrated development environment.

At the final step of the development, one user might desire to test the programs in a situation closer to the system of the product. Since the debugging kernel is not integrated in the product, another user might desire to test the programs without the debugging kernel. If there is no debugging kernel, the agent program 8 normally operates and the debugging tool can be used under the integrated development environment.

Figure 2:
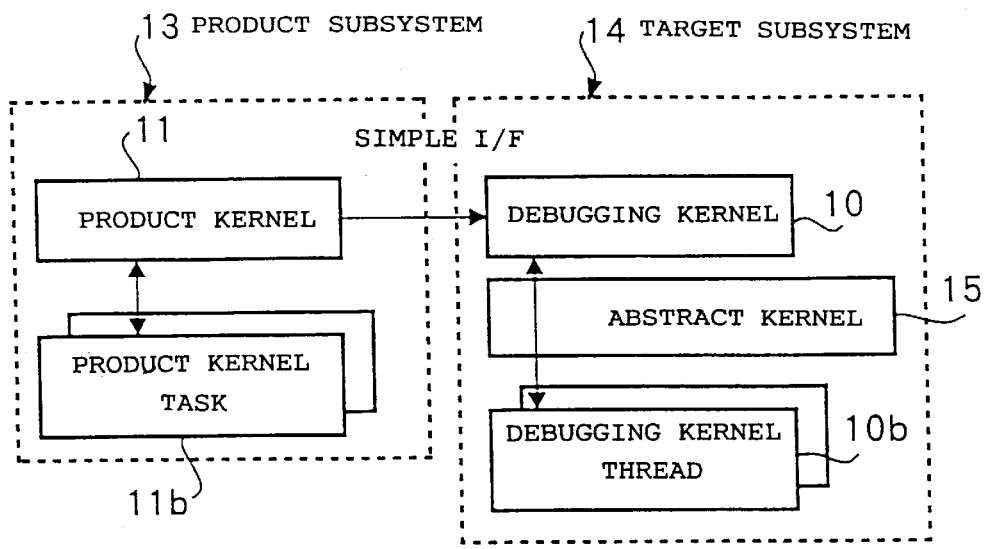
FIG. 2 is a diagram for illustrating functions of a debugging kernel as a main component of the present invention.

An abstract kernel 15 serving as an interface library is generated between the debugging kernel 10 and the controlled programs and enables a difference in the target environments to be easily ignored (refer to FIG. 2).

The separation of the host system operating on the host machine 1 and the target machine 6 is the reason why both the host machine 1 and the target machine 6 can be easily ported to existing development tools.

The host system has a basic debugging tool 5a for debugging the programs produced by the user, a system building tool 5b for structuring an environment of a system produced by the user, a project manager 5c for managing the source files of the system produced by the user, an environment server 5d needed when the basic debugging tool 5a executes the functions, and a database 5e for holding data needed under the present development environment.

The environment server 5d is independently designed by the functions of various components such as a CPU, a compiler, and a kernel. Therefore, if a new development tool, namely, a debugging tool, is provided in the host system, a server which depends on the debugging tool is formed. As long as information of the tool to be newly provided is added to the database 5e, the debugging tool can be integrated in the present development environment.

FIG. 2 is a detailed diagram of a target machine in which a debugging kernel function as a main component of the present invention is separated into a product subsystem and a target subsystem.

The debugging kernel 10 is a kernel function for controlling a real-time process based on an event driven preemption system. A unit of processing controlled by the debugging kernel 10 is defined as a thread (according to circumstances, referred to as a debugging kernel thread).

The debugging kernel 10 is a kernel on the target board for managing in an integrated manner a system of the integrated development environment operating on the target board (hereinlater, referred to as a target subsystem 14) and a system which is actually built in the product (hereinlater, referred to as a product subsystem 13). However, a product kernel 11 in the product subsystem 13 fundamentally does not recognize the existence of the debugging kernel 10.

The debugging kernel 10 controls all of the target programs via a simple interface (simple I/F) to the product kernel 11.

A function operating on the target subsystem 14 is loaded as a thread and is controlled by the debugging kernel 10. However, if no debugging kernel 10 exists, for whatever reason of the user, an interface of an interface library for eliminating those kinds of differences is provided. The interface library is referred to as the abstract kernel 15.

A debugging kernel thread 10b operating on the target subsystem 14 uses the debugging kernel 10 via the interface of the abstract kernel 15. A function provided by the debugging kernel 10 is referred to as a kernel function.

The debugging kernel 10 mainly has a thread scheduling function and an interrupt process function.

Figure 3:
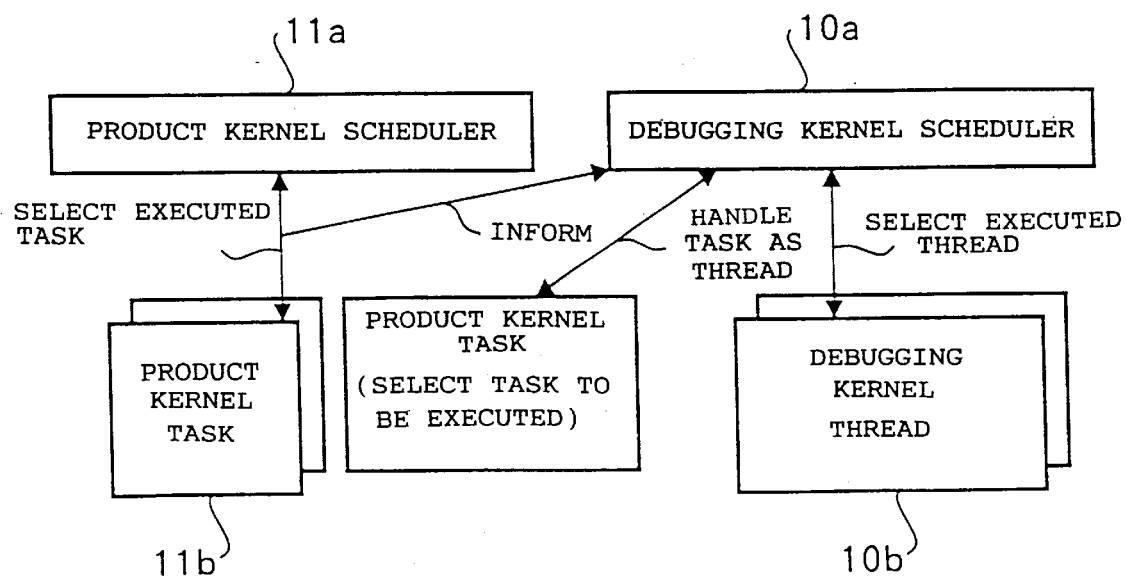
FIG. 3 is a diagram showing the relationship between a debugging kernel scheduler and a product kernel scheduler.

FIG. 3 is a diagram for illustrating the thread scheduling function and shows the relationship between a debugging kernel scheduler and a product kernel scheduler.

The debugging kernel 10 recognizes all of the processes on the target board and has a thread scheduling function (debugging kernel scheduler 10a) for determining the next process to be executed.

The threads have a priority and are scheduled according thereto. The product kernel 11 has a scheduling function (a product kernel scheduler 11a) and determines a product kernel task 11b to be executed next.

As the interface between the product kernel 11 and the debugging kernel 10, the product kernel 11 must call a scheduler of the debugging kernel 10 before the scheduling ends and the product kernel task 11b is thereafter executed.

The product kernel 11 informs the debugging kernel 10 of the priority of a thread to be currently executed, compares the priority thereof with the priority of the debugging kernel thread 10b to be currently executed, and determines which process is to be executed.

The debugging kernel 10 handles the product kernel task 11b of the product kernel 11 as a thread. However, it always recognizes only the product kernel task 11b of the product kernel 11 to be executed next. The debugging kernel 10 cannot recognize the circumstances of other tasks of the product kernel 11.

Figure 4:
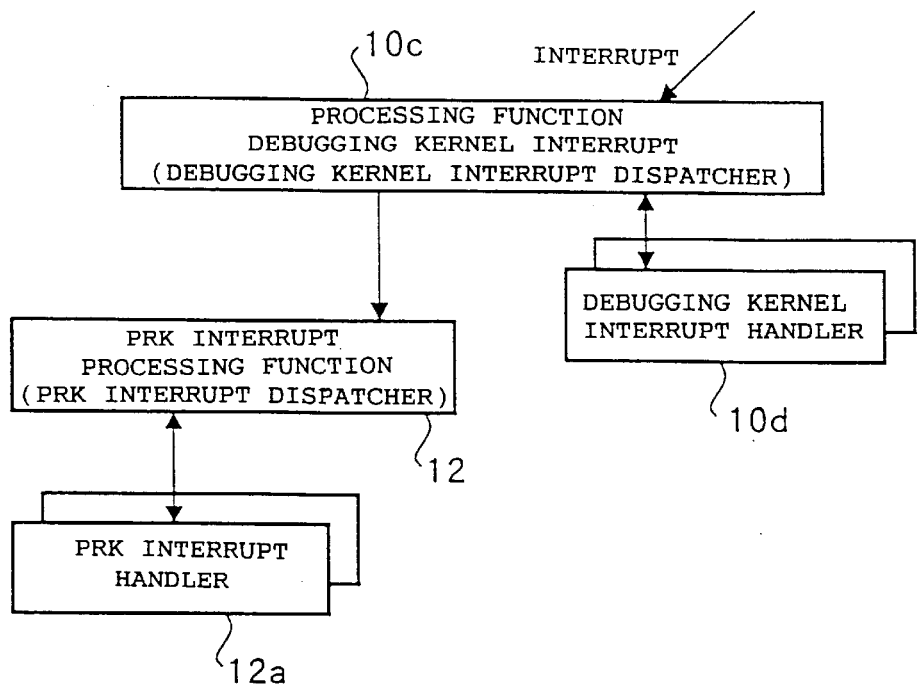
FIG. 4 is a diagram for illustrating an interrupting function of the debugging kernel.

FIG. 4 is a diagram for illustrating an interrupt function of the debugging kernel 10.

The debugging kernel 10 has a debugging kernel interrupt process function 10c, manages all interrupts on the target board, and performs proper processing. The interrupt process depends on the target board, so that a description is given of a process by a CPU in a hardware environment of the present system.

When an interrupt is caused, first of all, an interrupt dispatcher in the debugging kernel system executes a process. The debugging kernel 10 cuts the interrupt and performs a process if a device driver exists on the debugging kernel 10 side. In the case of interrupts other than the above-mentioned interrupts, the state when the interrupt is caused is stored and the process proceeds to a vector in the product subsystem 13. In this case, the interrupt process by the debugging kernel 10 is executed in a state in which the interrupts to the debugging kernel 10 are forbidden because the size of the interface between the product subsystem 13 and the target subsystem 14 is minimized. This process is executed on condition that an address of a product kernel interrupt dispatcher 12 for performing the interrupt process by the product subsystem 13 is informed to the debugging kernel 10.

Figure 5:
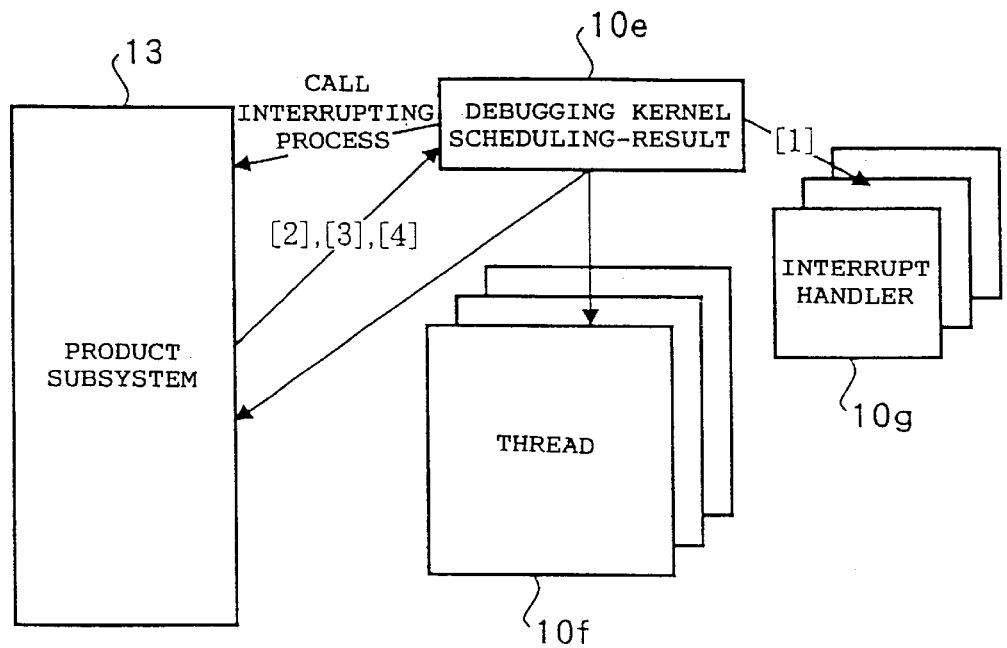
FIG. 5 is a diagram showing a flowchart of processes for the debugging kernel scheduling result.

FIG. 5 is a diagram showing a flowchart of processes for the debugging kernel scheduling result.

The priorities of the processes executed on the target board are as follows. The system is set so as to execute the processes according to the priority.

Priority (1): interrupt handler (debugging kernel 10)
Priority (2): interrupt handler (product kernel 11)
Priority (3): scheduling based on a priority which is common to the product kernel task 11b and the thread.

Care should be taken in the undermentioned points so as to follow the priorities. That is, in the case of interrupt process by the product subsystem 13, the processing routine advances from the execution of the kernel to the execution of a task via a task dispatcher. In this case, when an interrupt by a product system is caused while the debugging kernel 10 is being executed, the product subsystem 13 preempts the processes by the debugging kernel 10 (both the interrupt process and the thread process). In order to avoid this situation, the product kernel 11 in the product subsystem 13 and the debugging kernel 10 need the following interfaces:

(1) The interrupt process by the debugging kernel 10 is executed in the state in which interrupts to the debugging kernel 10 are forbidden. Accordingly, a process which requires a long time is executed as a thread 10f having a high priority.

(2) When the processing routine returns from the interrupt process by the product subsystem 13 to the task, the debugging kernel 10 is called. If the status changes in the threads of the debugging kernel 10, the scheduling of the debugging kernel 10 (including the product subsystem 13) is executed.

(3) When the task scheduling is performed by the product subsystem 13, the scheduling of the debugging kernel 10 is called according to the priority of a newly selected task.

(4) When an idle status of the system is realized by an idle task, the interface is automatically realized by the process of (3). However, in the case of using a kernel in which a program for detecting a ready task by an endless loop of a task scheduler is loaded, the state of entering the idle status is detected and the detected result might be reported to the debugging kernel 10.

Next, when no product kernel exists, the product subsystem 13 is considered to have a series of sequential processes and an interrupt handler. In this case, the debugging kernel 10 needs a call of the scheduler by returning from the interrupt. Because the thread cannot be operated.

System Mode and User Mode

The following modes are provided for the debugged state of the product subsystem 13.

A system mode is a mode in which the interrupt processes by the product subsystem 13 are forbidden and the product subsystem 13 is debugged in a state in which the process by the product subsystem 13 are stopped.

A user mode is a mode in which only a task to be debugged stops and both the interrupt process by the product subsystem 13 and the task continue to be executed. This is simply realized by managing the modes by the debugging kernel 10 and, in the system mode, by preventing the control operation by the product subsystem 13.

Figure 6:
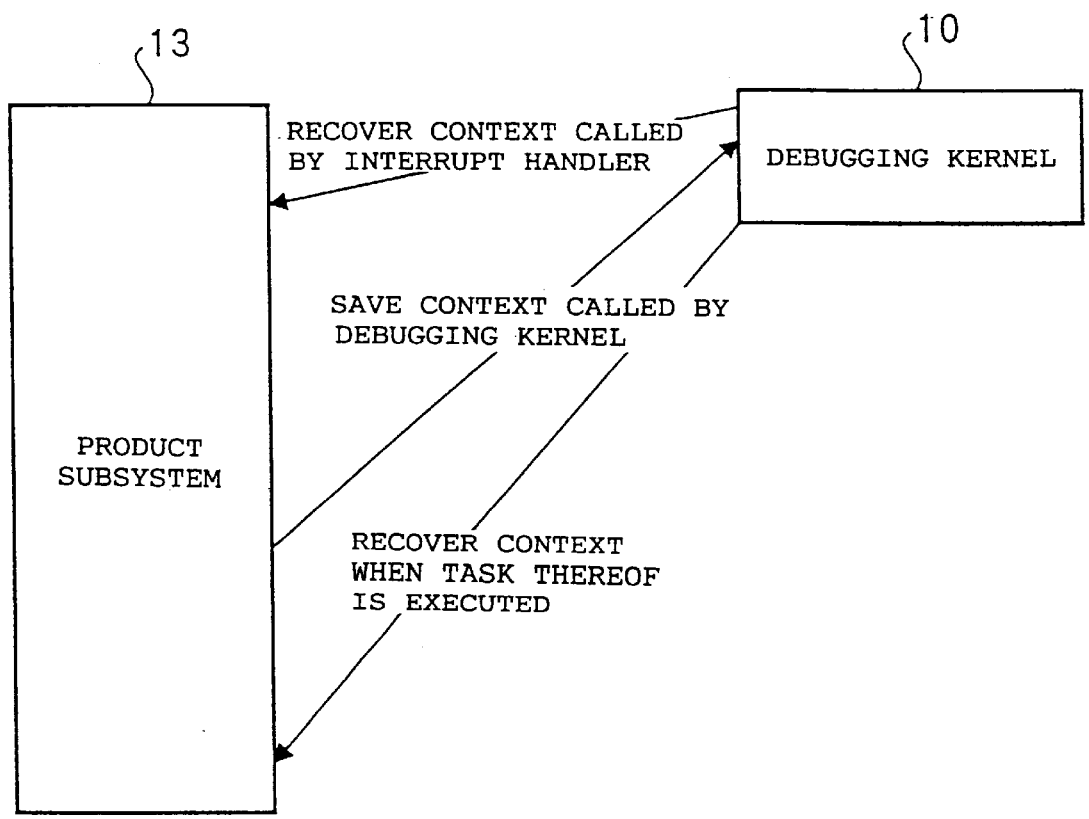
FIG. 6 is a diagram for illustrating context management under the debugging kernel.

FIG. 6 is a diagram for illustrating context management of the debugging kernel 10.

The context of the processes of the target subsystem 14 is saved in stack areas of the threads. Only one context of the processes of the product subsystem 13 is always managed and, when the thread scheduler of the debugging kernel 10 is called, the context is overwritten. When the control operation shifts from the target subsystem 14 to the product subsystem 13, the context is recovered and the processing routine resumes.

Figure 7:
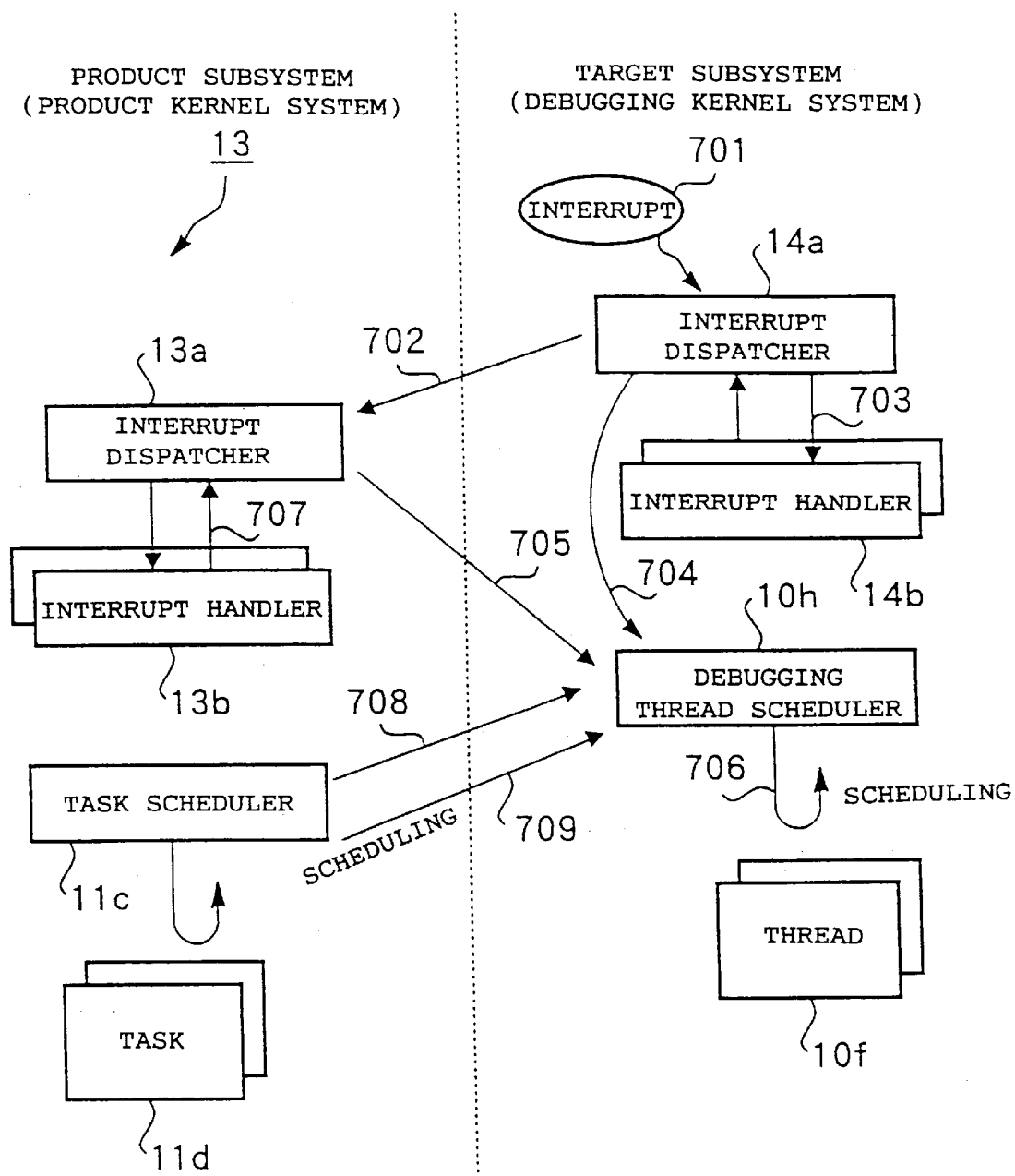
FIG. 7 is a diagram for illustrating an interface between the product kernel functions and the debugging kernel functions.

FIG. 7 is a diagram for illustrating the interface between the product kernel functions and the debugging kernel functions.

Processes for the interrupts and the scheduling are as follows.

Interrupt Process

An exceptional case (interrupt occurrence 701) is accepted by the debugging kernel 10 and is assigned to an interrupt dispatcher 14*a*. The interrupt to the product subsystem 13 is performed by calling an interrupt dispatcher 13*a* (702) and using an interrupt handler 13*b*. In the cases other than the above-described case, the interrupt is informed to the interrupt dispatcher 14*a* and then is processed by an interrupt handler 14*b*.

After the end of the interrupt process, when the processing routine returns to the interrupted point of the task or thread, it is necessary to call a debugging thread scheduler 10*h* (704, 705).

Scheduling

A task scheduler 11*c* schedules the task and calls the debugging thread scheduler 10*h* before switching the status (709). The debugging thread scheduler 10*h* is also called in the idle status (708).

Figure 8:
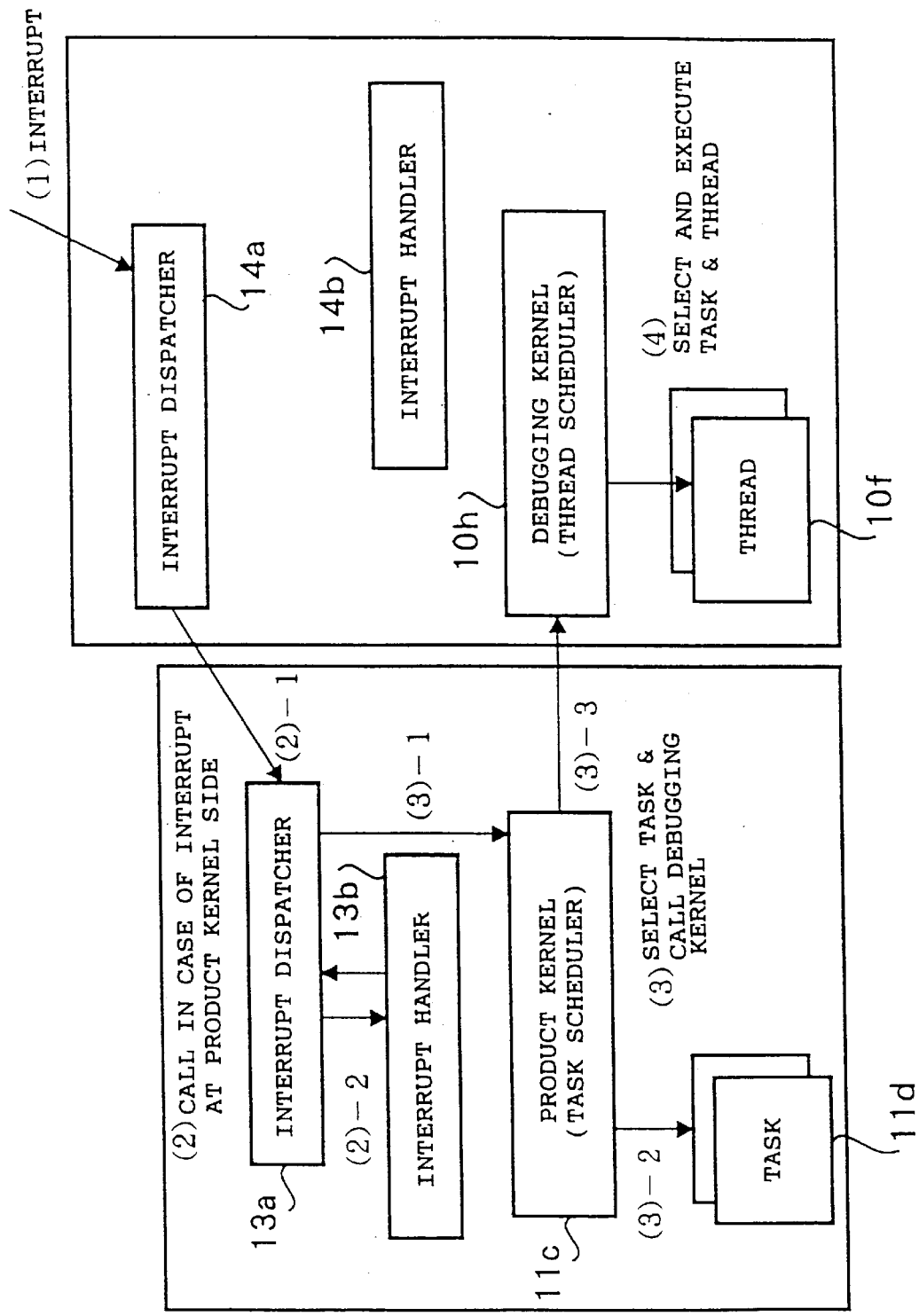
FIG. 8 is a diagram for illustrating one example of a flowchart of a control operation of the debugging kernel.
Figure 9:
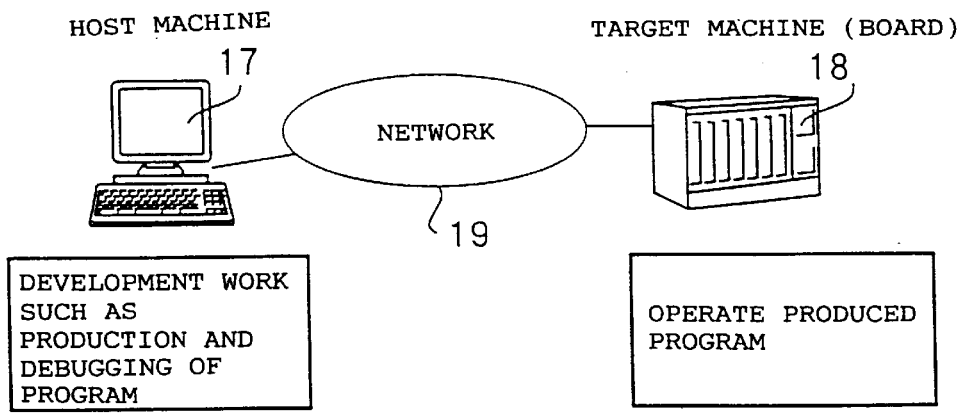
FIG. 9 is a schematic diagram of the framework of an integrated development environment.
Figure 10:
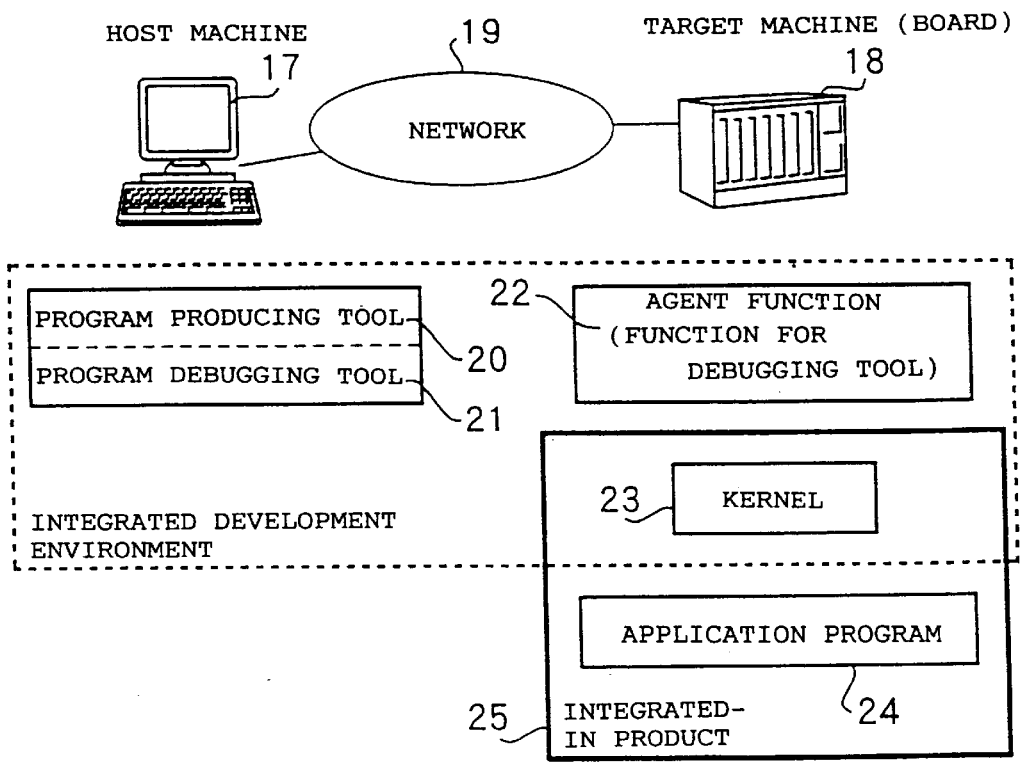
FIG. 10 is a diagram for illustrating functions of tools used under the integrated development environment.

FIG. 8 is a diagram for illustrating one example of a flowchart of the control operation by the debugging kernel 10.

(1) When an interrupt of the product kernel 11 occurs while the thread under the control operation of the debugging kernel 10 is being executed, the interruptive dispatcher 14*a* on the debugging kernel 10 side is activated in response to any interrupt. (2) When the interrupt dispatcher 14*a* determines whether or not the interrupt is at the product kernel 11 side and, as a result, the interrupt at the product kernel 11 side is determined, the interrupt dispatcher 13*a* at the product kernel 11 side is activated.

(3) When the interrupt causes a change in the task status in the product kernel 11 (scheduling is necessary), the task scheduler 11*c* of the product kernel 11 is activated and the scheduling is performed. After selecting a task 11*d* to be executed next, the task scheduler 11*c* calls the debugging kernel 10.

The debugging kernel 10 compares the priority of the product kernel task 11*d* on the product kernel 11 side with the priority of the thread 10*f* which currently has the highest priority. If the product kernel task 11*d* on the product kernel 11 side has a higher priority than that of the thread 10*f* on the debugging kernel 10 side, information on the thread 10*f* which has been executed is stored and the new product kernel task 11*d* is executed.

As described above, advantageously, the present invention can be applied not only to the kernel system comprising the host system having the program debugging tool and the target machine having a kernel, but also to a system without a kernel.

What is claimed is:

1. A debugging kernel system comprising:

a host system comprising a program debugging tool; and a target machine having a kernel, said target machine comprising:

a product subsystem; and a target subsystem having a debugging kernel, said debugging kernel comprising a thread scheduling function and an interrupt process function on said target subsystem:

wherein said debugging kernel controls said product subsystem and said target subsystem which has a function operating thereon that is loaded as a thread for control thereby, and said thread scheduling function assigns a priority to the threads and determines a process to be executed next by scheduling according to the priority, and said interrupt process function executes an interrupt process by performing a predetermined process between said product subsystem and said target subsystem so as to prevent said product subsystem from preempting a process of said debugging kernel.

2. A debugging kernel system according to claim 1, wherein:

said product subsystem comprises a product kernel for calling a scheduler of said debugging kernel before the scheduling ends and a task is thereafter executed and for informing said debugging kernel of the priority of a thread to be currently executed; and said debugging kernel compares said priority with the priority of the thread to be currently executed and determines the process to be executed.

3. A debugging kernel system according to claim 1, wherein:

said target subsystem has an abstract kernel; and a thread operating on said target subsystem uses the debugging kernel via an interface of said abstract kernel.

4. A debugging kernel system according to claim 1, wherein:

said debugging kernel has a system mode and a user mode for a debugging status of the product subsystem.

\* \* \* \* \*

UNITED STATES PATENT AND TRADEMARK OFFICE
CERTIFICATE OF CORRECTION

PATENT NO. : 6,754,851 B2
DATED : June 22, 2004
INVENTOR(S) : Miyoko Yoshimura

It is certified that error appears in the above-identified patent and that said Letters Patent is hereby corrected as shown below:

<u>Title page,</u>
Item [73], should read:
-- [73] Assignee: eSol Co., Ltd., Tokyo (JP) --

Signed and Sealed this

Twenty-sixth Day of July, 2005

JON W. DUDAS
*Director of the United States Patent and Trademark Office*